July 25, 1967
R. P. POPP ET AL
3,332,301
GEAR DRIVE
Filed Nov. 24, 1964
3 Sheets-Sheet 1
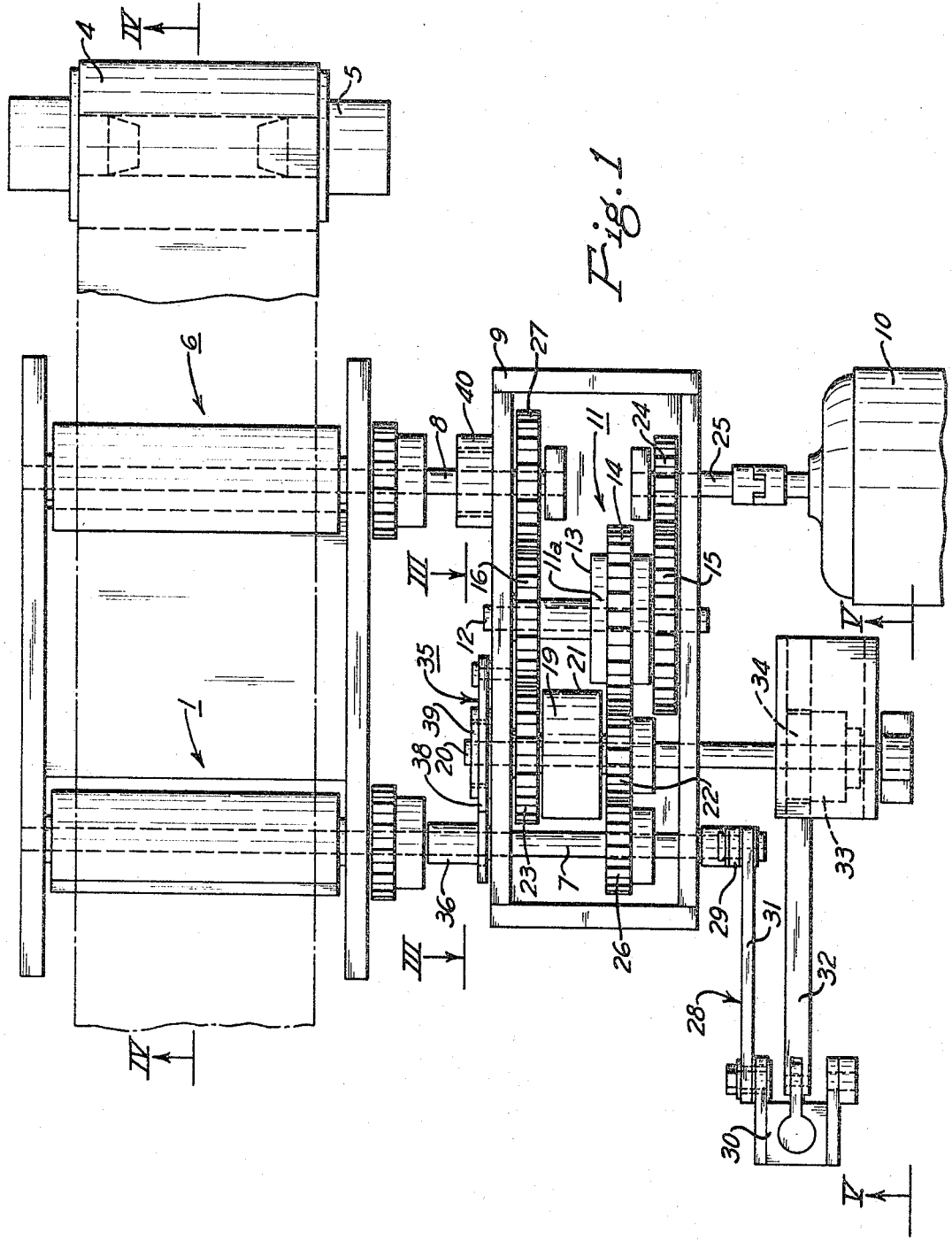
INVENTORS.
RAYMOND P. POPP
FREDERICK W. A. WARD
BY
*Webb, Burden, Robinson & Webb*
ATTORNEYS.

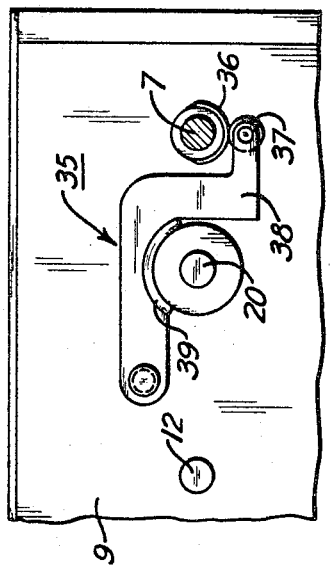
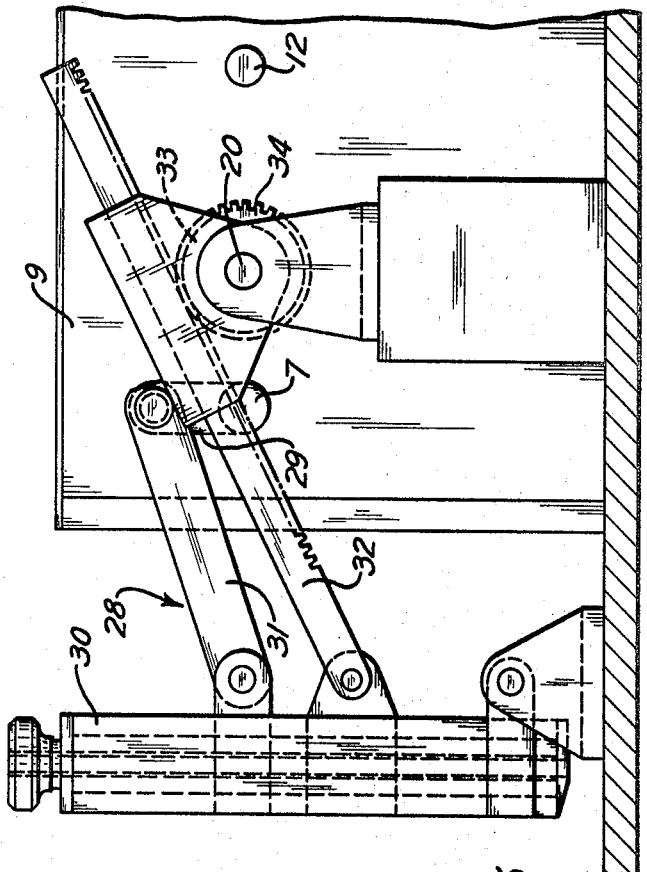
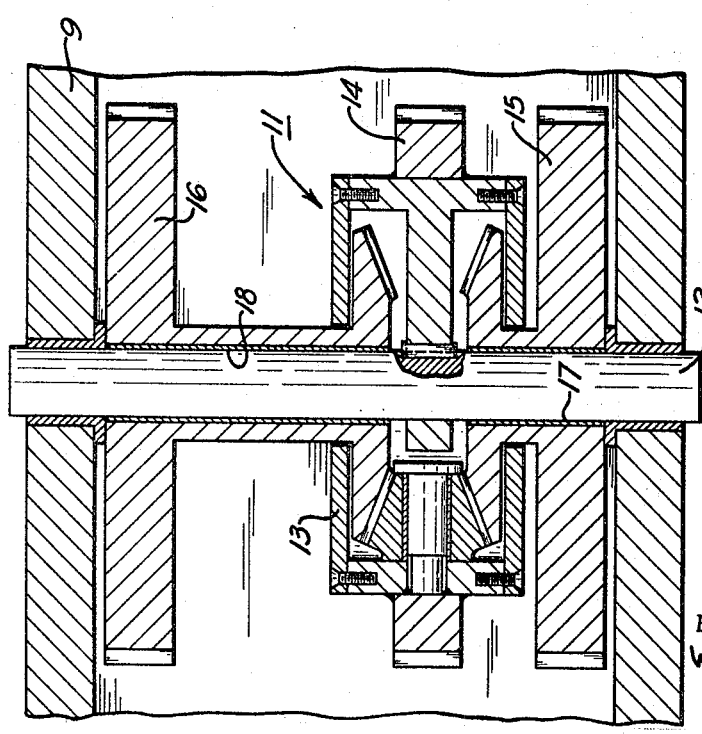

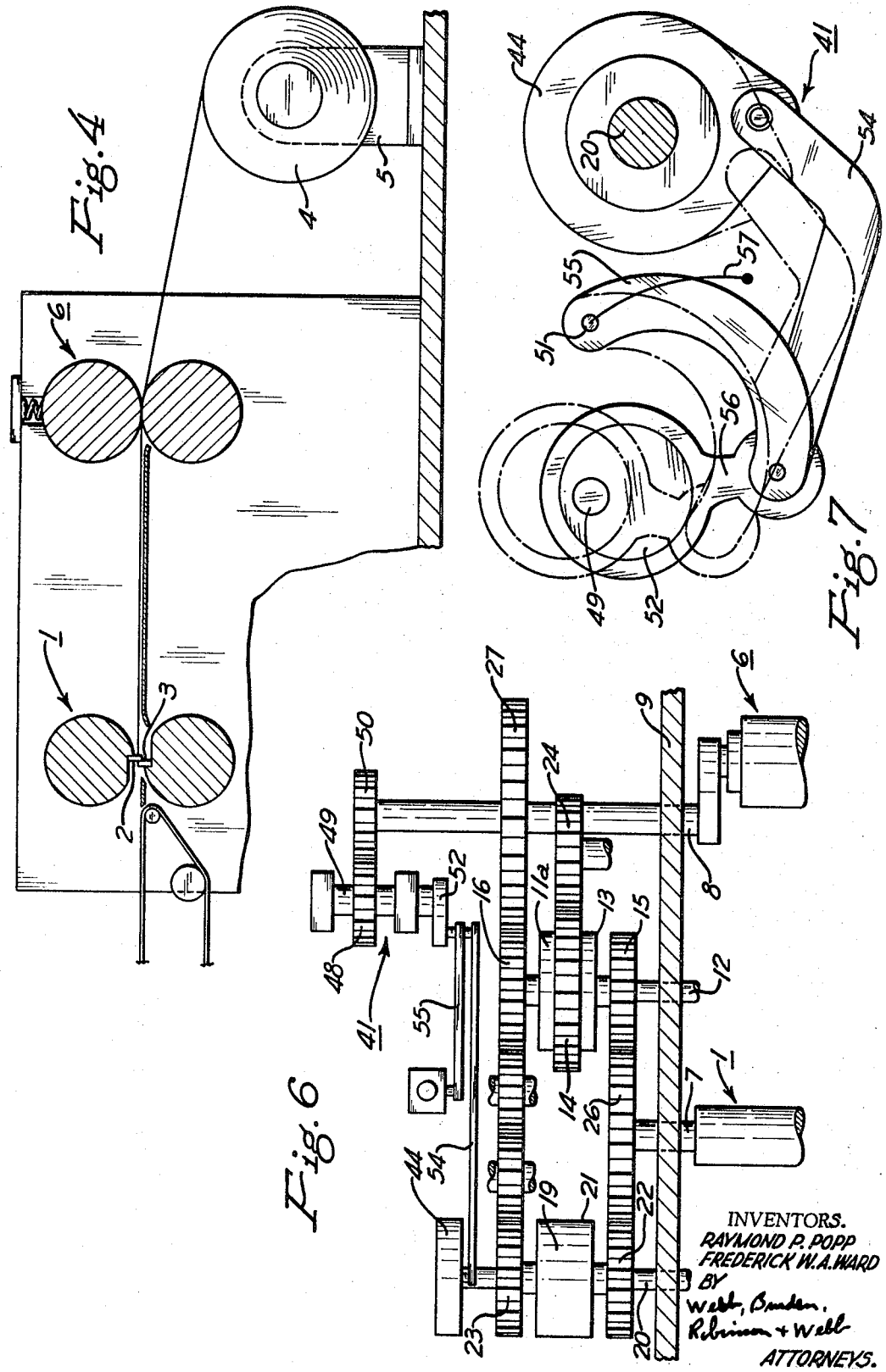

United States Patent Office 3,332,301
Patented July 25, 1967

3,332,301
GEAR DRIVE
Raymond P. Popp, Pittsburgh, and Frederick W. A. Ward, Zelienople, Pa., assignors to Origineers, Inc., Pittsburgh, Pa., a corporation of Pennsylvania
Filed Nov. 24, 1964, Ser. No. 413,500
18 Claims. (Cl. 74—675)

This invention relates to a gear drive which has at least two output drive shafts and, more particularly, to such a gear drive in which the two output drive shafts are synchronized during at least a portion of their revolutions. The gear drive has utility for a material feed machine and a work machine wherein the feed machine advances long, continuous lengths of material to the work machine which performs work operations, in many instances repeated operations, upon the material at given time intervals. In many cases, the work operation is repeated at relatively short time intervals and the material delivered by the feed machine to the work machine travels at a speed between 200–1000 feet per minute.

One specific example of apparatus which effectively uses the gear drive is a pinch roll stand or a roller leveler which feeds material such as metal strip or sheet from a coil of same to a shear which cuts the strip into given lengths or to a stamping machine or press which forms or presses articles as the strip is fed thereto.

In a large number of material processing, fabricating, forming, printing, shearing, stamping, pressing, etc. lines which handle metal strip, paper, plastic, rubber or synthetic rubber, etc., the material is in long lengths or in coils many hundreds of feet in length. Most of these lines require that a feed machine or device, which advances the material to a work machine for shearing, stamping, pressing, etc. the material, be synchronized with the work machine. These work machines generally perform repeated operations upon the material as it is continuously fed thereto, and many of these operations are performed at intervals of fractions of a second and a few seconds between one another.

To render such lines versatile for variations and modifications in the shearing, stamping, pressing, etc. operations, it is further required that the feed machine be so synchronized with the work machine that the feed machine advances given lengths of the material to the work machine and that these given lengths fall within a range of lengths and have a high degree of consistent accuracy in length between successive lengths. Preferably, the degree of accuracy between successive lengths should be about .020 inch in 5 feet, so that the product from the line meets close size and dimension specifications.

Heretofore, such lines have relied upon a combination of counting units and clutches to effect variations in lengths of the material fed to the work machine between successive work operations, or upon a combination of a single differential unit, a variable speed unit and elliptical gears. These combinations have been only partially successful in achieving accuracy of length between successive lengths fed to the work machine and as to the latter combination, inaccuracies occur due to limitations of the existing forms of variable speed gears used and due to slip in various clutch systems. Additionally, they are expensive and require substantial maintenance costs.

Our invention effects variations in the lengths of portions of the material fed to the work machine between successive work operations and achieves a high degree of consistent accuracy within a range of lengths between the successive portions of the material. Additionally, we obtain synchronism of the material fed to the work machine with performance of the work operation when the work machine engages the material while feed of the material to the work machine can be unsynchronized with the work machine operation at times other than those when the work operation is performed.

Specifically, our invention relates to a gear drive with at least two output drive shafts which are synchronized during at least a portion of their revolutions and comprises a first differential including at least one side gear means and a rotatable differential case in combination with a gear means rotatable with the first differential case. One of the gear means and of the first differential side gear means is disposed for engagement with a source of power for drivingly rotating same. The invention also includes a second differential which has first and second side gear means and a rotatable differential case. The first output drive shaft, one of the second differential side gear means and one of the gear means of the first differential case and of the side gear means of the first differential are in a gear train connection as is the second output drive shaft, the other of the second differential side gear means and the other of the gear means of the first differential case and of the side gear means of the first differential. Operatively connected to the second differential case is a driving means for effecting a change in speed of rotation of at least one of the side gear means of the second differential during a part of a revolution of same to effect a change in speed of at least one of the two output drive shafts. Our invention also comprises in combination with at least two output drive shafts a first rotatable axle and a first differential mounted upon this first rotatable axle. This first differential includes a differential case keyed to the first axle for rotation therewith, and first and second side gear means rotatable independently of the first axle. Mounted upon the first axle and rotatable therewith is a gear means. One of the side gear means of the first differential and of the gear means of the first axle is disposed for engagement with a source of power such as a motor for drivingly rotating same. Spaced apart from the first axle is a second rotatable axle with a second differential mounted thereupon. This second differential includes a differential case keyed to the second axle for rotation therewith, and also includes first and second side gear means rotatable independently of the second axle.

Our invention further comprises at least first and second rotatable output drive shafts with the first rotatable output drive shaft, one of the second differential side gear means and one of the gear means of the first axle and of the other of the side gear means of the first differential arranged in gear train connection. The second rotatable output drive shaft, the other of the second differential side gear means and the other of the gear means of the first axle and of the other of the side gear means of the first differential are likewise arranged in gear train connection. Connected to the second axle or to the second differential case is a driving means which effects a change in speed of rotation of each of said first and second side gear means of said second differential during at least part of a revolution of same to produce a change in speed of at least one of the two output drive shafts.

This change in speed of rotation of the second differential side gear means is an increase or decrease in speed of one side gear and a corresponding simultaneous decrease or increase in speed of the other side gear means. As a result, one of the two output drive shafts is accelerated a given amount while simultaneously the other of the two output drive shafts is decelerated the same given amount. This acceleration and deceleration of the first and second rotatable output drive shafts is effected through the gear train connections.

A modification of our invention operably connects one of the two output drive shafts to the driving means so that the output drive shaft connected to the driving means operates same and effects the change in speed of the second axle during a part of a revolution of the output drive shaft operably connected to the driving means. Also included in the modification is a brake which is movable into and out of engagement with the second axle to prevent rotation thereof during that portion of a revolution when the driving means is not accelerating or declerating same. Thus, this brake cooperates to assure synchronism between the two output shafts during a portion of a revolution of both and especially when the machines to which the shafts are connected are both performing a work operation.

Another modification of the invention applies a substantially constant load to one of the two output drive shafts. Generally this load is applied by a device in operative connection with one of the two output drive shafts and includes a brake, a drag generator or some other suitable load generating device. Preferably this constant load is substantially always greater than a load on the other output drive shaft and tends to assure a high degree of accuracy in cut when the drive is connected to a pinch roll and shear line. Additionally, the constant load controls overrun of elements of the drive and takes out backlash in the gears.

One of the output drive shafts is adapted for connection to a material feeding machine to operate it, and the other of the two output drive shafts is adapted for connection to a work machine to operate it.

A further embodiment of the invention has the gear means of the first axle instead of a side gear of the first differential disposed for engagement with a source of power for drivingly rotating the gear drive. In this case both output shafts are either in gear train connection with the two side gears of the first differential mounted by the first axle or in gear train connection with one side gear of the first differential and the gear means of the first axle.

The differentials include a type in which the case is rotatable upon and independently of the side gears. Such a differential does have its case mounted upon an axle for rotation therewith.

In the accompanying drawings, we have shown preferred embodiments of our invention, in which FIGURE 1 is a plan view of one embodiment of our gear drive applied to a pinch-roll stand and shear line;

FIGURE 2 is an enlarged longitudinal section view of one of the differentials of the drive of FIGURE 1;

FIGURE 3 is a view along the line III—III of FIGURE 1;

FIGURE 4 is a view along the line IV—IV of FIGURE 1;

FIGURE 5 is a view along the line V—V of FIGURE 1;

FIGURE 6 is a schematic plan view of a second embodiment of our invention; and

FIGURE 7 is a schematic view of one part of the device of the embodiment of FIGURE 6 which effects a change in speed of at least one of the two output shafts of the second embodiment.

Referring to FIGURES 1–5 inclusive, a conventional shear 1 which has blades 2 and 3 receives metal strip from a coil of strip 4 mounted upon a pay-off reel 5 and cuts the strip into a plurality of given lengths. A conventional pinch-roll stand 6 pulls the strip off the reel and advances it to the shear 1.

A first output shaft 7 drives the shear 1 and a second output shaft 8 operates the pinch-roll stand 6. These two output shafts are mounted by a gear box 9 and receive driving force from a conventional motor 10 through a gear drive 11 which can effect a change in speed of rotation of at least one of the two output drive shafts and which synchronizes the two output drive shafts during an arc of rotation when each length is cut from the coil of strip 4.

As shown, the gear drive comprises a first differential 11a mounted upon a first rotatable axle 12 supported by the gear box 9 and freely rotatable thereon. The first differential has its case 13 keyed to the first axle 12 so that the case is rotatable with the axle, and the case carries a ring gear 14 also rotatable with the axle. Additionally, the differential has a first side gear 15 and a second side gear 16, each rotatable upon the first axle on bearings 17 and 18 respectively and independently of the first axle. Side gear 15 rotates in a direction opposite to that of side gear 16.

A second differential 19 is disposed upon a second rotatable axle 20 arranged parallel to the first axle 12 and is supported by the gear box 9 so that it forms a part of the gear drive 11. The case 21 of this second differential is keyed to the second axle 20 and rotatable therewith, and the second differential includes a first side gear 22 and a second side gear 23 each mounted upon the second axle 20 similarly to the mountings of the side gears 15 and 16 of the first differential upon the first axle 12 and thereby rotatable independently of the second axle 20.

The gear drive 11 receives input power from a gear 24 carried by a stub shaft 25 and driven by the motor 10. This gear 24 meshes with side gear 15 and drivingly rotates the output shaft 7 through a first gear train comprising ring gear 14, side gear 22, and a gear 26 keyed to the output shaft 7. Driving rotation of the pinch-rolls of the stand 6 results from operation of a second gear train comprising side gear 16, side gear 23, and a gear 27 keyed to the output drive shaft 8. Thus, the input motion from the motor 10 goes into the side gear 15 and results in an output motion from both the side gear 16 and the ring gear 14. When the case 21 of the second differential is stationary, the gear ratios are so arranged that the rotation of the side gear 16 is twice that of the ring gear 14. Also, when the case of the second differential is in motion, this proportion of rotation of the side gear 16 and ring gear 14 is changed.

By rotation of the second axle 20 and the case 21 during a part of a revolution of same through a crank combination 28 driven off the output shaft 7, an equal balance in the rotation of the side gears 22 and 23 is changed and speed of rotation of the two output shafts is also changed. When the second axle 20 is rotated in one direction by the crank combination 28, motion is added to side gear 23 and the second gear train and the speed of rotation of output shaft 8 is increased while simultaneously the same amount of motion is subtracted from the first gear train so that the speed of rotation of the output shaft 7 is decreased. This increase in speed of the shaft 8 and the decrease in the speed of the shaft 7 results from addition of motion to side gear 23 and subtraction of motion from the side gear 22 and the second differential 19 permits such addition and subtraction of motion. The direction of rotation of the second axle 20 determines to which side gear rotation is added and to which side gear the same amount of rotation is subtracted. Thus, by turning the second axle in a controlled manner, the amount of strip fed to the shear 1 can be increased or decreased and during the arc of cut, the speed of the strip delivered to the shear by the pinch-rolls can be synchronized with the speed of the shear by holding the second axle 20 stationary. In this way, a high degree of consistent accuracy in cutting a plurality of selected given lengths from the coil of strip is achieved.

The crank combination 28 comprises an arm 29 rotated by the output shaft 7 and connected to a pivoted vertical post 30 through a link 31. Also, connected to the post 30 is a rack bar 32 which operates a one-way clutch 33 through a reciprocating motion effected by movement of the post 30 and by meshing teeth of the bar and a pinion gear 34 joined to the one-way clutch. This one-way clutch assures that motion is applied to the second axle 20 in one direction only. The connection of the rack bar 32 to the post 30 is adjustable vertically upon the post to produce a change in length of the stroke of the rack bar 32.

Thus, the amount of motion imparted to the second axle can be varied and thereby provide a range of different lengths which are cut from the coil of strip by the shear.

To assure that the second axle 20 is stationary and that the two output shafts 7 and 8 are synchronized during the arc of cutting the strip, a cam brake 35 (FIG. 3) engages the second axle 20 but moves out of engagement with this axle during those times when motion is added to or subtracted from the second axle by the crank combination. As shown in FIGURE 3, a cam 36 mounted by the output shaft 7 engages a cam follower 37 carried at one end of a pivoted brake arm 38 during the cutting operation to force a brake shoe 39, also carried by the arm, into braking contact with the second axle 20. Braking engagement of the shoe upon the second axle is released after completion of the cutting operation whereby addition or subtraction of motion to the output shafts is unhindered.

In a differential, when motion is applied to one member (a side gear or the case or axle to which the case is keyed), it is possible for output motion to be available at either or both of the remaining members of the differential. As to the gear drive of FIGURES 1–5 inclusive, division of output motion is under the control of the second differential which in turn is regulated by the output shaft 7. To prevent the output shaft 8 from receiving more than its share of motion, a drag or constant load is placed upon the shaft 8 so that the driving torque required by shaft 8 is greater than the torque required by the shaft 7 at all times. In this way, the shaft 8 does not become an "open end" in the gear drive. To provide this drag or constant load, we use a stabilizer brake 40 (FIGURE 1) on the output shaft 8. The constant load upon that shaft regulates overrun of any element of the gear drive, prevents unloading of the gear trains and backlash when the strip is cut and assures accuracy of cut. A drag generator is a suitable substitute for the stabilizer brake, as is any other device which is capable of applying a constant load upon the output shaft. Additionally, the pinch roll stand 6, a roller leveler, etc. can function as the constant load so long as strip traverses therethrough and same are operating upon the strip.

FIGURE 6 shows a second embodiment of our invention in which the same reference numerals refer to the same elements as the embodiment of FIGURES 1–5 inclusive. In this second embodiment, the input gear 24 meshes with the ring gear 14 of the first differential 11a instead of with the side gear 15, which is in the first gear train and in gear train connection with side gear 22 and gear 26 of the output shaft 7. The other output shaft 8 is driven through the second gear train and is in gear train connection with side gear 16 and side gear 23 and gear 27. In this gear drive both side gears 15 and 16 turn in the same direction and the direction of rotation is reversed to suit the second differential by placement of an odd number of gears in one train and an even number of gears in the other train. Motion is added to or subtracted from at least one of the two output drive shafts by an impulse drive 41 operatively connected through a one-way clutch 44 to the axle 20. As shown in FIGURE 6 this impulse drive 41 adds to or subtracts motion from the side gears 22 and 23 of the second differential 19 similarly to the crank combination 28.

The impulse drive 41 comprises a gear 48 of a shaft 49 which is driven by a gear 50 of the output shaft 8. This shaft 49 operates eccentric 52 which in turn motivates the one-way clutch 44 through a main link 54 connected thereto and a speed control arm 55 shown in FIGURE 7 joined to a connecting rod 56 of the eccentrics (FIG. 7). By positioning of a pivot 51 of the speed control arm 55 along an arc line 57 (FIG. 7), the amount of motion imparted to the one-way clutch 44 and thus the axle 20 to which the clutch 44 is affixed can be regulated from zero to a maximum amount.

While two devices for imparting added motion to at least one of the two output shafts have been shown, other structures which add or subtract motion to the output shafts can be satisfactorily used and include a worm gear and pinion combination and other suitable devices.

A third embodiment of our invention (not shown) uses a single side gear on the first differential 11a and places the single side gear in one gear train and the ring gear or an equivalent gear keyed to the first axle in the other gear train. Accordingly, in this third embodiment the input driving power is connected into one of the two gear trains so that only one of the two output shafts has motion added to or subtracted from same during at least a part of those periods when a work operation is not made by the work machine.

A fourth embodiment of our invention (also not shown) connects the impulse drive 41 of FIGURES 6 and 7 or the crank combination 28 to a side gear of the second differential 19 through a sprag or a one-way clutch for imparting motion, either to add or subtract to the speed of the two output shafts and uses a ring gear on the second differential 19 or a gear keyed to the second axle. In this fourth embodiment, the ring gear or its equivalent gear keyed to the second axle are placed in one gear train and the remaining side gear of the second differential in the other gear train.

In a fifth embodiment of our invention the impulse drive 41, the crank combination 28, the worm gear and pinion combination and any other suitable device which performs the functions of the foregoing are driven by a source of power independent of the one output drive shaft. Thus the apparatus which imparts an increase or decrease to the speed of at least one of the two output shafts can be operated by a source of power which receives a signal for actuating same by a control independent of the drive for the shear or the pinch-roll stand.

In order to obtain lengths of strip which are greater than the maximum length which can be produced during a single rotation of the output shafts, a miscut device (not shown) is connected to one of the knife elements of the shear. Such a device prevents the shear from cutting a length from a coil during one or more rotations of the output drive shafts and operates only upon a given cycle. Accordingly, where the miscut device is used, a subtraction or addition to the length to be cut is preferably divided between the number of cycles or rotations of the output drive shafts. For example, if one rotation of the output drive shafts produces a two-foot length and a length of five feet six inches is required, then three two-foot lengths or cycles are used with a subtraction of two inches from each cycle.

While we have shown and described preferred embodiments of our invention, it may be otherwise embodied within the scope of the appended claims.

We claim:

1. A gear drive with at least two output drive shafts synchronized during at least a portion of their revolutions comprising (a) a first rotatable axle;

(b) a first differential mounted upon said first axle and including a differential case disposed for rotation with said first rotatable axle, said first differential including at least one side gear means rotatable independently of said first axle;

(c) a gear means mounted upon said first axle and rotatable therewith;

(d) one of said gear means of said first axle and of said side gear means of said first differential being disposed for engagement with a source of power for drivingly rotating same;

(e) a second rotatable axle spaced apart from said first rotatable axle;

(f) a second differential mounted upon said second axle and including a differential case disposed for rotation with said second axle, said second differential including first and second side gear means rotatable independently of said second axle;

(g) at least first and second rotatable output drive shafts;

(h) said first output drive shaft, one of said second differential side gear means and one of said gear means of said first axle and of said side gear means of said first differential being in gear train connection;

(i) said second output drive shaft, the other of said second differential side gear means and the other of said gear means of said first axle and of said side gear means of said first differential being in gear train connection;

(j) driving means operatively connected to one of said second differential case and of said second axle for effecting a change in speed of rotation of at least one of said side gear means of said second differential during at least a part of a revolution of same to effect a change in speed of at least one of said two output drive shafts.

2. A drive for a material feed machine and a work machine which receives material fed by said feed machine and performs a work operation on said material which is in either given lengths or a continuous length, said drive comprising (a) a first rotatable axle, (b) a first differential mounted upon said first axle and including a differential case disposed for rotation with said first axle, said first differential including first and second side gear means rotatable independently of said first axle, one of said first and second side gear means of said first differential being disposed for engagement with a source of power for drivingly rotating same, (c) a gear means mounted upon said first axle and rotatable therewith, (d) a second rotatable axle spaced apart from said first axle, (e) a second differential mounted upon said second axle and including a differential case disposed for rotation with said second axle, said second differential including first and second side gear means rotatable independently of said second axle, (f) at least first and second rotatable output drive shafts;

(g) said first output drive shaft, one of said second differential side gear means and one of said gear means of said first axle and of the other of said side gear means of said first differential being in gear train connection;

(h) said second output drive shaft, the other of said second differential side gear means and the other of said gear means of said first axle and of said other of said side gear means of said first differential being in gear train connection;

(i) driving means operatively connected to said second axle for effecting a change in speed of rotation of each of said first and second side gear means of said second differential during at least a part of a revolution of same to produce a change in speed of at least one of said two output drive shafts, one of said output drive shafts being connected to said feed machine for operating same and the other of said two output drive shafts being connected to said work machine for operating same.

3. A gear drive with at least two output drive shafts synchronized during at least a portion of their revolutions comprising (a) a first differential including at least one side gear means and a rotatable differential case;

(b) a gear means rotatable with said first differential case;

(c) one of said gear means of said first differential case and of said first differential side gear means being disposed for engagement with a source of power for drivingly rotating same;

(d) a second differential including first and second side gear means and a rotatable differential case;

(e) at least first and second rotatable output drive shafts;

(f) said first output drive shaft, one of said second differential side gear means and one of said gear means and of said first side gear means of said differential being in gear train connection;

(g) said second output drive shaft, the other of said second differential side gear means and the other said gear means and of said side gear means of said first differential being in gear train connection;

(h) driving means operatively connected to said second differential case for effecting a change in speed of rotation of at least one of said side gear means of said second differential during a part of a revolution of same to effect a change in speed of at least one of said two output drive shafts.

4. The gear drive of claim 3 characterized by a brake means movable into and out of engagement with said second differential case for controlling rotation thereof other than that produced by said driving means.

5. The gear drive of claim 3 characterized by one of said two output drive shafts having a substantially constant load applied thereto.

6. The gear drive of claim 4 characterized by means in operative connection with one of said two output drive shafts for applying a substantially constant load thereto, said means being such that said load on said one output drive shaft is substantially always greater than a load on said other output drive shaft.

7. A gear drive with at least two output drive shafts synchronized during at least a portion of their revolutions comprising a first differential including first and second side gear means and a rotatable differential case; a gear means rotatable with said first differential case, one of said first differential case gear means and of one of said first differential side gear means being disposed for engagement with a source of power for drivingly rotating same; a second differential including first and second side gear means and a rotatable differential case; at least first and second rotatable output drive shafts; said first output drive shaft, one of said second differential side gear means and said other side gear means of said first differential being in gear train connection; said second output drive shaft, the other of said second differential side gear means and that one of said gear means of said first differential case and of said one side gear means of said first differential not disposed for said source of power being in gear train connection; driving means operatively connected to said second differential case for effecting a change in speed of rotation of at least one of said side gear means of said second differential during a part of a revolution of same to effect a change in speed of at least one of said two output drive shafts.

8. A drive for a material feed machine and a work machine which receives material fed by said feed machine and performs a work operation on said material which is in either given lengths or a continuous length, said drive comprising a first differential including a first and second side gear means and a rotatable differential case; a gear means rotatable with said first differential case; one of said gear means of said first differential case and of one of said side gear means of said first differential being disposed for engagement with a source of power for drivingly rotating same; a second differential including first and second side gear means and a rotatable differential case; at least first and second rotatable output drive shafts; said first output drive shaft, one of said second differential side gear means and said other side gear means of said first differential being in gear train connection; said second output drive shaft, the other of said second differential side gear means and that one of said gear means of said first differential case and of said one side gear means of said first differential not disposed for said source of power being in gear train connection; driving means operatively connected to said second differential case for effecting a change in speed of rotation of each of said first and second side gear means of said second differential during at least a part of a revolution of same to produce a change in speed of at least of one of said two output drive shafts; one of said output drive shafts being connected to said feed machine for operating same and the other of said two output drive shafts being connected to said work machine for operating same.

9. The drive of claim 8 characterized by brake means movable into and out of engagement with said second differential case for controlling rotation of same other than that produced by said driving means.

10. The drive of claim 8 characterized by one of said two output drive shafts having a substantially constant load applied thereto.

11. The drive of claim 10 characterized by means in operative connection with one of said two output drive shafts for applying a substantial constant load thereto, said means being such that said load on said one output drive shaft is substantially always greater than a load on said other output drive shaft, and by brake means movable into and out of engagement with said second differential case for controlling rotation of same other than that produced by said driving means.

12. A gear drive with at least two output drive shafts synchronized during at least a portion of their revolution comprising a first differential including at least one side gear means and a rotatable differential case; a gear means rotatable with said first differential case; one of said gear means of said first differential case and of said first differential side gear means being disposed for engagement with a source of power for drivingly rotating same; a second differential case including first and second side gear means and a rotatable differential case; at least first and second rotatable output drive shafts; gear means rotatable with said second differential case; said first output drive shaft, one of said second differential side gear means and one of said first differential case gear means and of said side gear means of said first differential being in gear train connection; said second output drive shaft, said second differential case gear means and the other of said gear means of said first differential case and of said side gear means of said first differential being in gear train connection; driving means operatively connected to said other of said second differential side gear means for effecting a change in speed of at least one of said one side gear means of said second differential and said second differential case gear means during a part of a revolution of same to effect a change in speed of at least one of said two output drive shafts.

13. The drive of claim 12 characterized by one of said two output drive shafts having a substantially constant load applied thereto.

14. The drive of claim 12 characterized by brake means movable into and out of engagement with said side gear means of said second differential to which is connected said driving means for controlling rotation thereof other than that produced by said driving means.

15. A gear drive with at least two output drive shafts synchronized during at least a portion of their revolutions comprising a first differential including first and second side gear means and a rotatable differential case; a gear means rotatable with said first differential case; one of said gear means of said first differential case and of one of said side gear means of said first differential being disposed for engagement with a source of power for drivingly rotating same; a second differential including first and second side gear means and a rotatable differential case; a gear means rotatable with said second differential case; at least first and second output rotatable drive shafts; said first output drive shaft, one of said second differential side gear means and said other of said side gear means of said first differential being in gear train connection; said second output drive shaft, said second differential case gear means and that one of said gear means of said first differential case and of said side gear means of said first differential not disposed for said source of power being in gear train connection; driving means operatively connected to said other of said second differential side gear means for effecting a change in speed of rotation of at least one of said one side gear means of said second differential and of said gear means of said second differential case during at least a part of a revolution of same to produce a change in speed of at least one of said two output drive shafts.

16. The drive of claim 15 characterized by one of said two output drive shafts having a substantially constant load applied thereto.

17. The drive of claim 15 characterized by means in operative connection with one of said two output drive shafts for supplying a substantially constant load thereto, said means being such that said load on said one output drive shaft is substantially always greater than a load on said other output drive shaft and by brake means movable into and out of engagement with said other side gear means of said second differential for controlling rotation thereof other than that produced by said driving means.

18. A gear drive with at least two output drive shafts synchronized during at least a portion of their revolutions comprising
(a) a first rotatable axle,
(b) a first differential mounted upon said first axle and including a differential case disposed for rotation with said first rotatable axle, said first differential including first and second side gear means rotatable independently of said first axle, one of said first and second side gear means of said first differential being disposed for engagement with a source of power for drivingly rotating same,
(c) a gear means mounted upon said first axle and rotatable therewith,
(d) a second rotatable axle spaced apart from said first rotatable axle,
(e) a second differential mounted upon said second axle and including a differential case disposed for rotation with said second axle, said second differential including first and second side gear means rotatable independently of said second axle;
(f) at least first and second rotatable output drive shafts;
(g) second axle gear means rotatably mounted by said second axle;
(h) said first output drive shaft, one of said second differential side gear means and one of said gear means of said first axle and of the other of said side gear means of said first differential being in gear train connection;
(i) said second output drive shaft, said second axle gear means and the other of said gear means of said first axle and of said other of said side gear means of said first differential being in gear train connection;
(j) driving means operatively connected to said other of said second differential side gear means for effecting a change in speed of rotation of at least one of said one side gear means of said second differential and said second axle gear means during at least a part of a revolution of same to produce a change in speed of at least one of said two output drive shafts.

References Cited

UNITED STATES PATENTS

| | | | |
|---|---|---|---|
| 2,201,581 | 5/1940 | Hallden | 83—298 |
| 2,476,266 | 7/1949 | Trofimov | 74—675 X |
| 2,911,760 | 11/1959 | Barradell-Smith | 74—675 X |
| 3,156,150 | 11/1964 | Sarka | 83—313 X |

MARK NEWMAN, *Primary Examiner.*

RALPH D. BLAKESLEE, *Examiner.*